Aug. 28, 1956  E. WILDHABER  2,760,359
YIELDING ROLLER, ESPECIALLY FOR UNIVERSAL JOINTS
Filed April 24, 1952  3 Sheets-Sheet 1

INVENTOR.
ERNEST WILDHABER
BY
ATTORNEY

Aug. 28, 1956  E. WILDHABER  2,760,359
YIELDING ROLLER, ESPECIALLY FOR UNIVERSAL JOINTS
Filed April 24, 1952  3 Sheets—Sheet 2

INVENTOR.
ERNEST WILDHABER
BY
ATTORNEY

Aug. 28, 1956  E. WILDHABER  2,760,359
YIELDING ROLLER, ESPECIALLY FOR UNIVERSAL JOINTS
Filed April 24, 1952  3 Sheets-Sheet 3
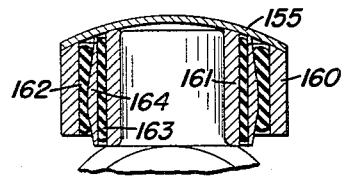
FIG. 13.
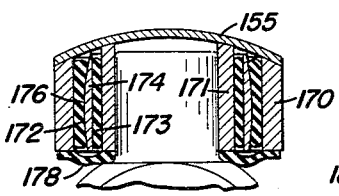
FIG. 14.
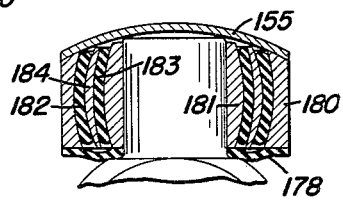
FIG. 15.
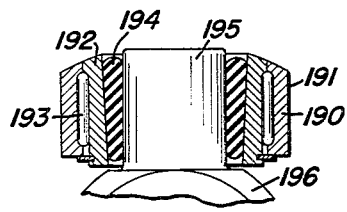
FIG. 16.
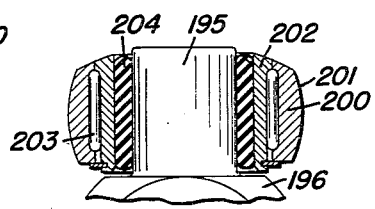
FIG. 17.
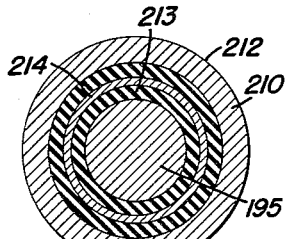
FIG. 18.
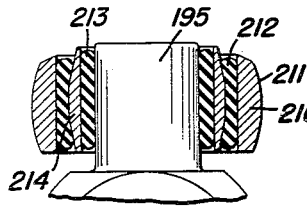
FIG. 19.
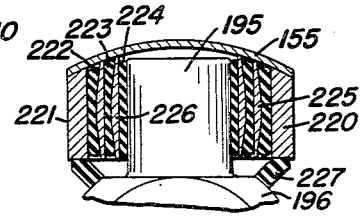
FIG. 20.
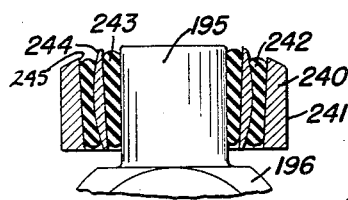
FIG. 21.
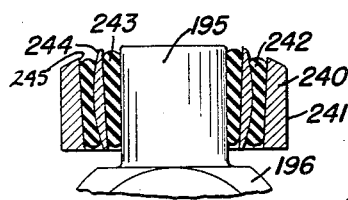
FIG. 22.
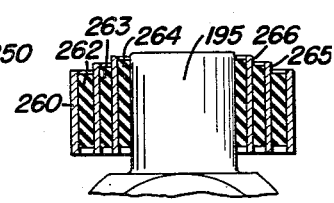
FIG. 23.
FIG. 24.
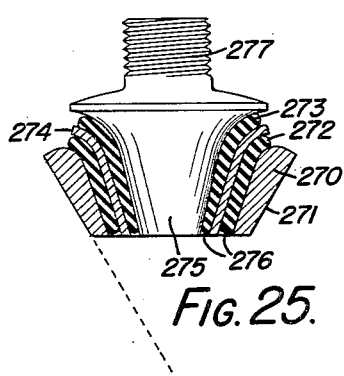
FIG. 25.
INVENTOR.
ERNEST WILDHABER
BY
ATTORNEY

United States Patent Office 2,760,359
Patented Aug. 28, 1956

2,760,359

YIELDING ROLLER, ESPECIALLY FOR UNIVERSAL JOINTS

Ernest Wildhaber, Brighton, N. Y.

Application April 24, 1952, Serial No. 284,005

3 Claims. (Cl. 64—8)

The present invention relates to resilient laminated mountings and connections, especially for use in universal joints for transmitting the load between the two end members of a joint. In another aspect, the invention relates to universal joints in which yielding rollers are used to connect the two end members of the joint and to transmit the load between them. In still another aspect, the invention relates generally to stratified or laminated type mountings or connections having adjacent resilient layers, made of rubber or rubber-like material, separated by a layer of relatively rigid and strong material which is bonded to the layers of resilient material.

The present invention constitutes a continuation of and improvement upon my pending application Serial No. 280,538 filed April 4, 1952.

One object of the present invention is to provide a yielding roller, for use in a universal joint, for instance, which is capable of carrying higher loads than known yielding rollers.

Another object of the invention is to provide a yielding roller for universal joints which is adapted to be mounted on an axis radial to one of the two axes of the joint and which permits increased yielding at increased distances from said one joint axis without materially shifting the resulant load axially of the roller away from said one joint axis.

Another object of the invention is to provide a yielding roller having pairs of rubber layers separated by and bonded to a layer of more rigid and strong material, in which the last-named layer has an improved shape.

Another object of the invention is to provide a universal joint having two end members coaxial with the two joint axes, respectively, in which one of the end members is in the form of a spider having radial pivot portions that have a plurality of intersecting axes, said pivot portions carrying yielding rollers which engage in ways provided in the other end member.

A further object of the invention is to provide a universal joint equipped with resilient rollers constructed according to the present invention, thereby to obtain higher load capacity.

Another object of the invention is to provide yielding laminated rollers employing rubber layers so shaped as to reduce the tension stresses.

A still further object of the invention is to provide a ring-shaped yielding part requiring minimum space.

Other objects of the invention will be apparent hereinafter from the specification and from the recital of the appended claims.

In the drawings:

Figs. 1 to 3 inclusive are diagrammatic sectional views illustrating the principle on which the present invention is based, Fig. 1 showing a cross-section of a ring-shaped yielding part under radial load, Fig. 2 being an axial section taken along the line 2—2 of Fig. 1, and Fig. 3 being an axial section taken along the line 3—3 of Fig. 1;

Figs. 13, 14 and 15 are axial sections showing various forms of rollers constructed according to the present invention, and such as might be used in the universal joints shown, mounted on the pivot portions of one of the end members of the joint, the views of the pivot portions being taken along the axes of their respective end members;

Fig. 16 is a similar axial section showing a roller constructed according to a further modification of the invention;

Fig. 17 is a section similar to Fig. 16, illustrating a further embodiment of roller;

Fig. 18 is a cross-section of a type of roller with multiple rubber sleeves where the rubber is bonded to the pivot portion of the roller in accordance with a further embodiment of my invention;

Figs. 19 to 22 are axial sections through further forms of rollers constructed according to this invention;

Fig. 23 is a cross-section of a roller of modified form;

Fig. 24 is an axial section of a roller with a flexible outer rim constituting a further modification of the invention; and Fig. 25 is an axial section of a tapered roller constructed in accordance with the present invention.

Figure 1:
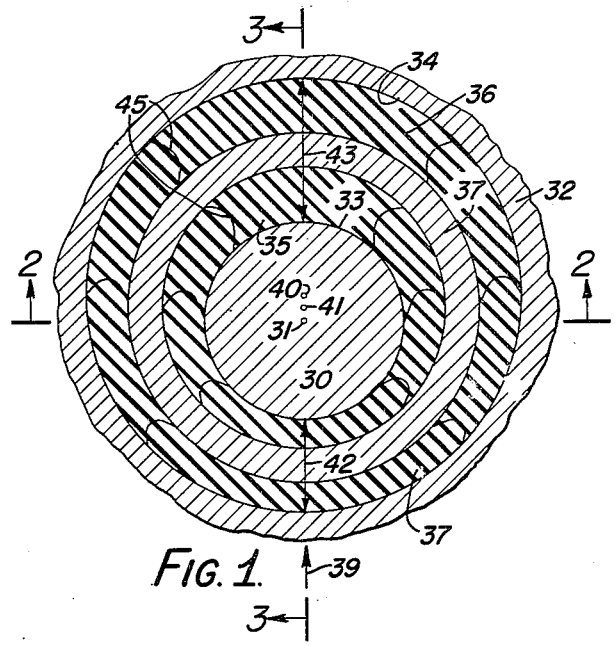

In my U. S. patent application Serial No. 280,538 above mentioned, there is disclosed a new concept of laminated materials composed of a plurality of rubber layers where adjacent layers are bonded to and separated by layers of relatively rigid material of great strength. The detailed anlaysis of this new concept will merely be summed up here with the help of Figs. 1 to 3 inclusive; and reference may be had to my prior application above-mentioned for a more detailed analysis thereof.

In Figs. 1 to 3, 30 denotes a central part or pivot pin whose axis is at 31. 32 is an outer part which may be the rim portion of a roller, or any other part, mounted upon the pivot pin 30. The space between the outside surface 33 of the pivot pin and the inside surface 34 of the part 32 is filled with a laminated structure comprising two rubber sleeves 35 and 36 that are separated by a sleeve 37 of relatively rigid material of great strength. The sleeve 37 may be made of steel, preferably hardened, or steel alloys, or nylon, etc. Both rubber layers 35 and 36 are bonded to the sleeve 37; and they are bonded to the surfaces 33 and 34, respectively.

In the position of rest, that is, at zero load, the centers of the pivot portion 30, of the inside surface 34 of outer part 32, of the outside surface 33 of pivot portion 30, and of the sleeve 37 coincide. A radial load in the direction of the arrow 39, however, causes the part 32 to approach the pivot pin 30 in the region 42, so that the center 40 of the inside surface 34 moves beyond the center 31 of the pivot pin, and the center of the sleeve 37 moves to the position 41. This displacement has reduced the space between the pivot pin and the inside surface 34 in the region 42 and has widened it in the region 43.

Rubber is practically incompressible. While it yields under pressure it tends to escape laterally. Its density and specific gravity is nearly unaffected by pressure. Other yielding substances, here referred to as rubber, may be less incompressible but also have the tendency to escape laterally as they yield. In Fig. 1, the lines 45 have been drawn to indicate this movement or flow of the rubber. These lines were radial lines at zero load when the centers 31, 40 and 41 all coincided; and lines 42 and 43, which are directly in line with the direction 39 of applied pressure, remain straight. It is the intermediate lines 45 which bulge out, indicating the rubber flow from the region 42 toward the region 43.

Figure 3:
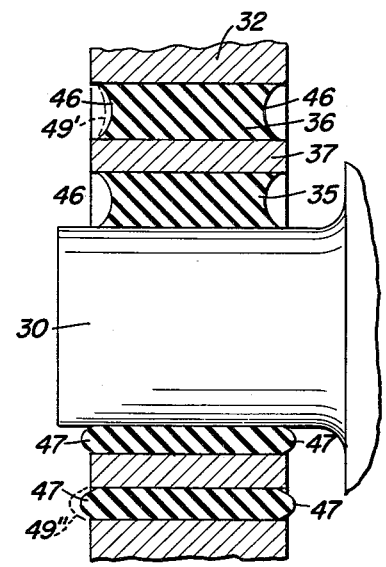
Figure 2:
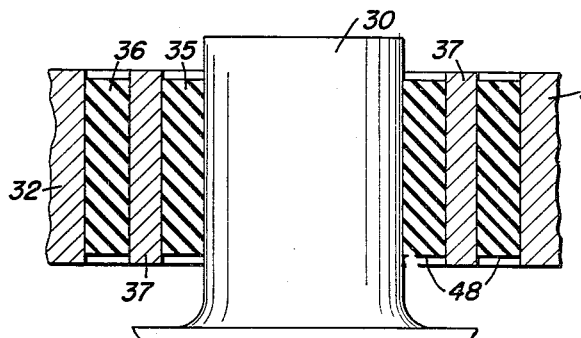

While pressure exists in the zone 42 of approach, where the rubber is being squeezed out, the opposite zone 43, the zone of recess tends to be under tension. Here the rubber tends to be drawn in. All of the profiles of the rubber layers are straight at zero load, and these profiles remain approximately straight on the line 2—2 (Fig. 1), as shown at 48 in Fig. 2. As shown in Fig. 3, the end profiles 46 of the rubber layers 35 and 36 in the zone 43 of recess, however, become concave, and the end profiles 47 of the rubber layers in the pressure zone 42 become convex. The profiles 48 shown in Fig. 2 are approximately half-way between the profiles 46 and 47.

The rubber flow is opposed by the bond between the rubber and the adjacent surfaces of pivot pin 30, sleeve 37, and part 32. At the bond the rubber does not move. It is anchored there. This bond keeps the amount of rubber displacement down. It takes much pressure to squeeze the rubber outwardly against the hold of the bond.

This laminated structure, composed of rubber layers separated by a layer of relatively rigid and strong material and having the rubber bonded or vulcanized to all the surfaces it contacts, will yield laterally in the direction of the layers as much as if the rubber layers were in one piece of the same aggregate thickness, but it yields less to load perpendicular to the layers. It can also take more of that load without distress. For the rubber layers a soft flexible rubber is preferred.

In accordance with a known theory, which is now well established, the stress and labor of a material is caused by shear stresses. Shear stresses also accompany one-directional pressure or tension; but pressure from all directions, which will be called hydraulic pressure, does not cause shear stresses and produces no distress. Hydraulic pressures are permissible which are many times the allowable one-directional pressures for rubber as well as other materials.

In the laminated mounting described hydraulic pressures are created under compressive loads which multiply the known load capacity of the rubber itself. At the same time the yielding properties are correspondingly reduced.

My analysis explained in detail in my prior application above mentioned, applies to layers of moderate thickness and compares rubber layers of equal shape and equal aggregate thickness. When, for instance, two layers and three layers are compared, their thicknesses in the comparison are at the proportion of three to two, respectively. From this the properties of a single layer are arrived at by obvious arithmetic.

The following conclusions were arrived at per equal aggregate rubber thickness, equal shapes and equal material. At equal distress, and equal maximum shear stress, approximately:

1. The load capacity for normal load is inversely proportional to the thickness of the individual rubber layers. This is said under the assumption of correct design with the relatively rigid portions strong enough to take the load.
2. The yield at this load is proportional to the thickness of the individual rubber layers.
3. For load in the direction of the layers, the capacity and the yield are independent of the thickness of the individual rubber layers.

Thus, if a single layer is compared with two rubber layers of half its thickness the two layers can take double the load. Under this double load they yield only half as much as a single layer does under its own load. The overall deflection of a laminated structure having generally plane laminations, or of a yielding ring or sleeve with a laminated cross-section, increases with increasing load; but the deflection is not directly proportional to the load. At large loads the deflection increases more slowly.

I have found and disclosed in my prior application that the deflection-load properties can be influenced by the shape of the end profiles of the rubber layers at zero load. Thus convex end profiles 49, such as provided on the rubber sleeves 35' and 36' of the mounting shown in Fig. 4, make the laminated mounting harder in compression but softer in tension. The shape, which this profile takes under tension, is denoted in dotted lines at 49' in Fig. 3; and the shape which it assumes under compression is indicated in dotted lines at 49" in this same figure. Profile 49' is nearly the reverse of profile 49. It is only slightly longer. In the position 49' only moderate (negative) hydraulic pressures are set up which do not multiply the natural stresses. They are much smaller than the hydraulic pressures set up in the pressure zone where the profile 49" bulges out sharply. It is to be noted that profile 49" is longer than original profile 49.

The overall hardness of the composite or laminated material is caused primarily by hydraulic pressures set up in the rubber layers. Accordingly, the moderate pressures set up on the tension side leaves the material relatively soft so that the tension stresses are much smaller than the compression stresses in the opposite zone. This remedies a limitation of the rubber layer. They can take a very large hydraulic pressure without distress, incomparably larger than one-directional pressure. There is a limit, however, to all-directional tension, or negative hydraulic pressure. The bond itself presents a limit. By reducing these tension stresses the composite material can be loaded more without distress.

In accordance with the present invention the inner rubber layer 35' (Fig. 4) of a flexible circular laminated mounting or connection is made axially longer than the adjacent outer rubber layer 36' to balance the properties of the two layers. More generally, the rubber layers of different radii are preferably so designed that they have equal shear stresses and equal labor at equal outside loads. Where the rubber layers of different radii have equal axial lengths I preferably make the inner layer slightly thinner to attain this equality of shear stresses at equal outside loads.

In the rubber the maximum shear stress and the maximum labor is at the outside ends. In the layer or sleeve 37' of relatively rigid material, which is interposed between layers 35' and 36', the maximum stress is at the middle. The hydraulic pressures in the rubber are balanced by tension in the layer 37' of relatively rigid material, hereafter called the holding layer. They extend in the direction of the middle surface of the holding layer. At the same time this layer is under compressive stress in a direction perpendicular to the layer, caused by the load and the hydraulic pressures in the rubber. These stresses add to one another. Both tend to thin out the layer 37' and to draw its ends outwardly. The holding layer 37' is therefore highly loaded and should be made of one of the strongest available materials.

In accordance with one aspect of the present invention the holding layer is made of varying thickness. It is made thicker where more strength is needed. It is made thicker at the middle portion of its length than at the ends. This is shown for a plane laminated mounting in Fig. 5.

Here the mounting or connection comprises end plates 55 and 56, rubber layers 57, 58 and 59, and intermediate, rigid, strong, holding layers 60 and 61. The mounting is intended to carry a main load in a general direction 63 perpendicular to the layers. The holding layers 60 and 61 have a maximum thickness at their middle portion and decrease in thickness from said middle portion toward their ends 62. The holding layers are just as strong at their ends as if the maximum thickness were to continue to the ends. They are, however, lighter, and allow the use of more rubber, which is of advantage in the naturally confined space of the mounting.

The holding layers 60 and 61 (Fig. 5) and 37', 32 (Fig. 4) preferably extend beyond the rubber layers to avoid stress weakness at the ends of the rubber material.

Figure 6:
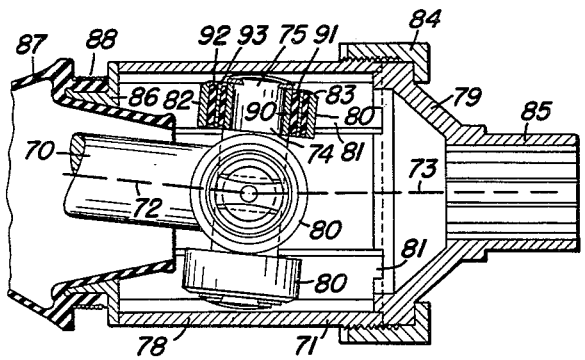
Fig. 6 is an axial section of a universal joint constructed according to one embodiment of the present invention and employing yielding rollers, the end members of the joint being shown with their axes angularly disposed to one another.
Figure 7:
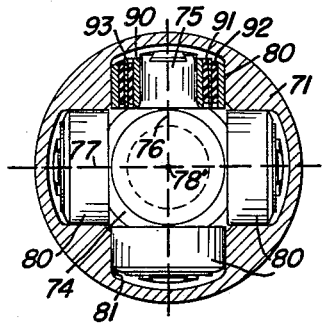
Fig. 7 is a transverse section through the joint of Fig. 6, but with the joint axes in axial alignment.

One embodiment of the universal joint constructed according to the present invention is illustrated in Figs. 6 and 7. This joint comprises two end members 70 and 71 which are coaxial, respectively, with the joint axes 72 and 73. The end member 70 comprises a shaft portion and a spider 74 which is integral with the shaft portion. The spider contains a plurality of pivot portions or pins 75 which project radially outwardly. There are four equi-angularly spaced such pivot pins in the embodiment shown. The axis of one pair of pivot pins is denoted at 76. The axis of the other pair is at 77. The axes 76 and 77 are contained in a plane perpendicular to the axis 72 of the end member 70. They are radial of axis 72 and intersect at point 78' on axis 72.

End member 71 comprises, besides internal member 78, a connecting member 79 which is rigidly secured to the internal member by means of a flanged nut 84 that threads onto the outside of member 78. A gasket may, if desired, be interposed between the parts 78 and 79 to provide a seal for the lubricant. The connecting member 79 has an internally splined hub 85 adapted to connect it with a shaft.

At the end opposite to hub 85, the sleeve 78 is brazed or otherwise rigidly secured to an end plate 86 to also provide a seal for the lubricant. To this end plate is attached a flexible cover 87 of neoprene or the like by means of a clamp 88. If desired, this cover may be bonded or vulcanized to the end plate. The cover 87 may be of known construction.

In accordance with the present invention yielding rollers 80 are mounted on the radial axes or pivot pins 75 to turn thereon. Preferably a plurality of pairs of rollers are employed, the rollers of each pair being coaxial. This results in a compact design of high load capacity. Also, the motion transmitted by this joint is more nearly uniform than the motion transmitted in a conventional joint.

The rollers 80 engage plane-sided ways 81 which are formed internally in the part 78 of end member 71 and which extend parallel to the axis 73 of the end member 71. In the embodiment illustrated each of the rollers 80 has a relatively rigid rim 82 that has a cylindrical outside surface and a spherical end surface 83. The cylindrical outside surfaces of rims 82 are adapted to contact the plane sides of the ways 81.

Preferably the yielding rollers contain rubber between the outside rim and the pivot. However, if desired, the pivot itself may be held in rubber instead. Broadly it should be understood that the term "yielding roller" is meant to include also cases where the rubber is stationary and is not inside the roller rim. Any use of rubber makes it a yielding roller.

Figure 4:
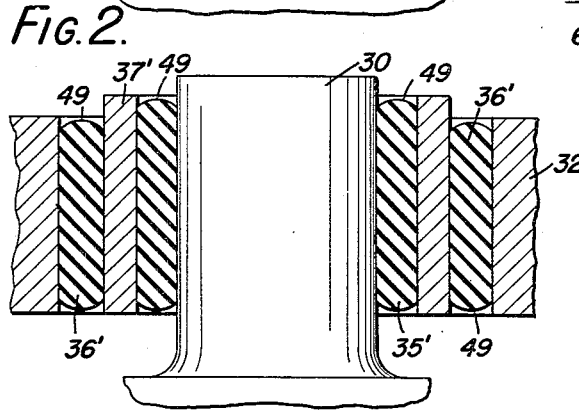
Fig. 4 is an axial section, similar to Fig. 2, and showing a circular laminated mounting constructed in accordance with a modification of the present invention.
Figure 5:
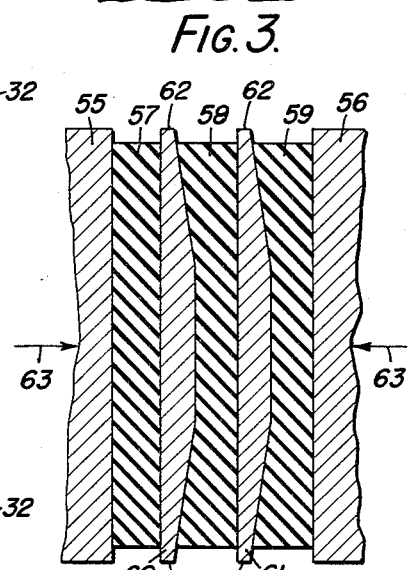
Fig. 5 is a section of a laminated mounting constructed according to another embodiment of the invention and illustrating another feature of the invention.

Each roller 80 shown in Figs. 6 and 7 contains a hub portion 90 mounted to turn on one of the pivot pins 75. Rubber is disposed between the hub portion 90 and the rim 82. It is split up into two circular portions 91 and 92 of different radii by a circular part or generally circular part 93 of relatively rigid and very strong material. The rubber is bonded to this part on both inside and outside. It is also bonded to the hub portion 90 and to the inside surface of the rim 82. The rubber portions 91 and 92 and the part 93 are here shown in the form of sleeves. The rubber portions may have convex profiles in their axial sections as shown in Fig. 4. The sleeve 93 shown is of uniform thickness but rigid sleeves, which are thickest at their middle portion as described in Fig. 5, are preferably used, especially on medium and large sizes.

A number of modifications may be made in the yielding rollers which may be used in the universal joint of Figs. 6 and 7.

Figures 8, 9:
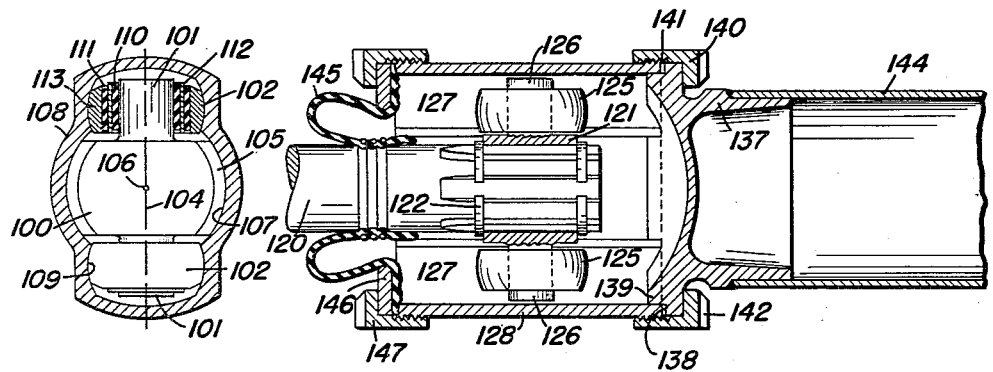
Fig. 8 is a cross-section, similar to Fig. 7, of a modified form of universal joint.
Fig. 9 is an axial section of a universal joint constructed according to a further embodiment of the invention, the shaft axes being shown in alignment.

Fig. 8 shows an application of my rollers to a universal joint which has only one pair of coaxial rollers. Here the spider member 100 of the joint has but two radial pivot pins 101. These have a common axis 104. A pair of rollers 102 are mounted on the two coaxial pivot portions 101 of the spider 100.

Where a plurality of roller pairs are used with intersecting axes angularly disposed to one another the need for yielding rollers is imperative. With a single coaxial roller pair it is possible to use rigid rollers. Where only a single pivot axis 104 is available, however, as is the case in the embodiment of Fig. 8, it is desirable to center the end members lengthwise of this axis. This may be done by providing a spherical portion 105 on the spider that is centered at the intersection 106 of the axis with the axis of the end member that carries the spider. This spherical portion bears against an internal cylindrical surface 107 provided on the other end member 108 of the joint. The rollers 102 shown in Fig. 8 are spherical rollers, that is, they have spherical outside surfaces which engage cylindrical side surfaces 109 of ways formed in the end member 108. The cylindrical surfaces 109 extend parallel to the axis of the end member 108.

The roller structure otherwise is similar to that shown in Fig. 4, the inside rubber sleeve 110 being bonded directly to the pivot portion 101 and being separated from the outside rubber sleeve 111 by a rigid sleeve 112 made of very strong material. The rubber sleeves are bonded to sleeve 112 on its outside and inside surfaces. They are also bonded to the roller rim 113 and to the pivot 101, respectively.

Figure 10:
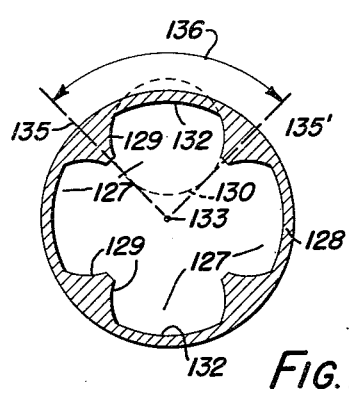
Fig. 10 is a cross-section of that part of that end member of this joint which is provided with the roller-receiving ways.
Figure 11:
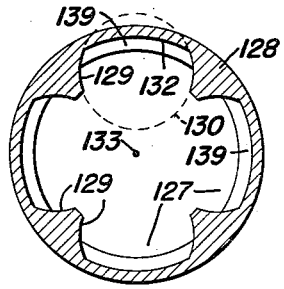
Fig. 11 is a cross-section of this part of the joint taken in a plane parallel to the section of Fig. 10 and looking at the member which connects this part with one of the shafts that are connected by the joint.

Another embodiment of universal joint constructed according to the present invention is shown in Figs. 9 to 11 inclusive. Here one end member comprises a shaft 120 which is splined and has the spider 121 mounted thereon, the spider being secured against axial movement relative to the shaft by split rings 122.

Here spherical rollers 125 are employed. I preferably use rollers of relatively large diameter to obtain more load capacity. These are mounted upon the pivot pin portions 126 of the spider. They engage ways 127 formed internally in the sleeve 128 that constitutes one part of the other end member of the joint.

The ways 127 extend parallel to the axis of the last-named end member. In cross-section the ways 127 have side surfaces that are of circular arcuate profile 129, opposite side surfaces of a way being arcs of the same circle 130 (Fig. 10). Preferably the ways 127 extend clear through the sleeve 128 from one end to the other. Each way has a bottom surface 132 which is of less curvature and longer than one of the arcs 129. Opposite tangents 135, 135' to the circle 130 which are drawn through the axis 133 include an angle 136 with each other that is larger than 60°. The connecting bottom surface intersects the circle 130 and is a circular arc centered on the axis 133 of the end member 128. Enough clearance should be provided between the rollers 125 and the bottoms 132 of the guideways to permit tipping of the rollers in operation.

At one end of the end member 128 is a connecting member 137 which transmits torque. This contains an end face 138 and projections 139 which project into the ways 127 and act like keys or splines contacting the sides and bottom of the ways. The contact at the bottoms of the ways serves for centering the part 128 on the part 137. The keys 139 provide positive transmission of torque. A gasket 141 is inserted between the face 138 and the opposed end face of the member 128. Pressure is exerted between the face 138 and the opposed end face of the member 128 through the gasket by a flanged nut 140 which threads onto the end member 128. Gripping teeth 142 may be provided at the end face of the nut to permit its being threaded or unthreaded. Through the nut, gasket, and keys 139 a rigid connection is provided between the member 128 and the member 137 which is also leak-proof so far as the lubricant is concerned.

A seal 145 is interposed between the shaft 120 and the member 128. A disc 146 and nut 147 may be provided for securing the seal 145 in position.

The joint illustrated in Figs. 9 to 11 inclusive connects the shaft 120 with a tubular shaft 144 of relatively large diameter and length. The construction illustrated differs from the conventional one in that the member 128, which contains the internal ways, is rigidly connected with the tubular shaft 144. The rigid connection of this member with the tubular shaft 144 makes for rigidity and simplicity.

Figure 12:
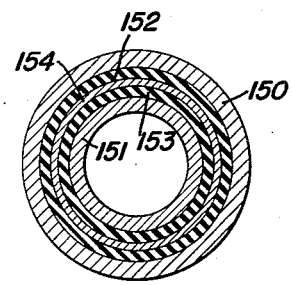
Fig. 12 is a cross-section of a roller, such as might be used in the universal joints shown, and taken at right angles to the axis of this roller.

Fig. 12 shows a roller constructed according to another embodiment of the invention. The roller here shown in cross-section contains an outer rim 150 and a hub 151 which is adapted to be mounted on the pivot pin. Rubber is disposed between the outer rim 150 and the hub 151. It is split up into a plurality of sleeves 152 and 153 by a sleeve 154 of relatively rigid and very strong material bonded on both sides to the rubber. The rubber is also bonded to the inside surface of the rim 150 and to the outside surface of the hub 151. Fig. 12 could be a section through the roller of any one of Figs. 13, 14 and 15.

The rollers shown in all of Figs. 13, 14 and 15 have spherical end caps 155 secured in each case to the outer rim of the roller with a bond by cementing, vulcanizing, soldering, etc. This bond is applied after the rubber sleeves are in place but in a way not to damage the rubber.

In Fig. 13 the roller comprises a rigid rim portion 160, an internal rigid hub portion 161 and two rubber layers or sleeves 162 and 163 separated by a layer 164 of rigid, strong material. The layers 162 and 163 are bonded to the rigid layer 164 and to the parts 160 and 161.

In Fig. 14 the roller likewise comprises a rigid rim portion 170, an internal rigid hub portion 171 and two rubber layers or sleeves 172 and 173 separated by a layer 174 of rigid, strong material. The layers 172 and 173 are bonded to the rigid layer 174 and to the parts 170 and 171.

The hubs 161, 171 (Figs. 13 and 14) may contact the cap 155 but are relatively movable thereon. The sphere radius of the outside surface of the caps is made equal to the radius of the cylindrical bottom surfaces 132 (Fig. 10) of the ways engaged thereby. It is equal to the distance of each bottom 132 from the axis of rotation of the member 128 which contains the ways. In operation the centrifugal force of the rollers is taken up through the caps by the bottoms 132 of the ways.

It should be noted that of the two adjacent rubber sleeves of different radii, 162, 163 or 172, 173, the one of smaller radius is axially longer. That is the inner sleeve, 163, 173, is longer. This is done for best utilization of space. Also the rubber sleeves have convex end profiles at zero load in the example shown in Figs. 13 and 14. Furthermore the sleeve 164 (Fig. 13), 174 (Fig. 14) of rigid material has varying thickness. It is thickest at its middle portion and tapers off toward its ends. The sleeve 164 of Fig. 13 has a cross-section composed of straight lines. It has a cylindrical inside surface and its middle portion has also a cylindrical outside surface. The portions of its outside surface which connect the middle portion with its two ends are conical. The rigid sleeve 174 of Fig. 14 also has a cylindrical inside surface but its outside surface is of arcuate profile 176. When the rigid sleeve has a cylindrical surface at one side and an opposite surface of changing radius I preferably put the cylindrical surface on the inside.

In Fig. 15 the roller comprises a rigid rim portion 180, a rigid hub 181, and two rubber layers or sleeves 182 and 183 separated by a rigid sleeve 184. Here, the rubber sleeves 182 and 183 and rigid sleeve 184 are of curved cross-section axially. Such sleeves permit an angular adjustment of the outer rim 180 with a minimum of stress.

In Fig. 14, as well as in Fig. 15, the roller is not only covered at one end by a cap 155 but is sealed at its opposite end by a flexible seal 178 made of a material unaffected by the lubricant. This seal connects the rim 170, 180 with the hub 171, 181, respectively, and is bonded or otherwise tightly secured to the rim and associated hub. Since one end of each roller is sealed by the cap 155, the rubber sleeves 172, 173, 182, 183 are not reached by the outside lubricant. They can be made of a soft flexible rubber which does not have to be inert to the lubricant.

A further type of yielding roller is shown in Figs. 16 and 17. The roller of Fig. 16 has a rim 190 with a cylindrical outside surface 191. The rim is mounted on an inner race 192 by a needle bearing 193 whose needles roll in a recess or raceway in the rim. A slightly tapered rubber sleeve 194 is bonded to the cylindrical outside surface of the pivot 195 and to the slightly conical inside surface of the race 192. The taper of the rubber sleeve 194 is in a direction increasing toward the outside to soften the rubber sleeve toward the outside where it has to yield more under load.

The roller shown in Fig. 17 has a rim 200 that has a spherical outside surface 201. This roller is capable of tipping about the sphere center. The outer rim 200 is mounted on the inner race 202 by a needle bearing 203. The needles of this bearing roll in a recess or raceway in the rim. As before, the inner race 202 is connected with the pivot 195 through a rubber sleeve 204 that is bonded to both. The rubber sleeves 194 (Fig. 16) and 204 (Fig. 17) have convex end profiles in accordance with my invention to render them softer in tension, that is, to keep down tension stresses.

Fig. 18 is a cross-section which might be a section through any of the rollers of Figs. 19, 21 and 22. Its parts are designated by the same reference numerals as used in Fig. 19, however, so that they may readily be identified. Figs. 19, 21 and 22, and the remaining figures show several modifications of a type of roller in which the turning motion of the rim is taken by the rubber and somewhat stresses the rubber. The rubber is bonded to the pivot or pivot portion 195. It is also bonded to the outside rim in all the several remaining modifications except the one shown in Fig. 23.

The roller shown in Fig. 19 has a rim 210 which has a spherical outside surface 211. The rubber is split into a plurality of sleeves 212 and 213 by a holding sleeve 214 of relatively rigid material that is bonded thereto on both sides. The holding sleeve has a varying thickness, being thickest at its middle portion. The inner rubber sleeve 213 is longer axially than the rubber sleeve 212 to make up for its smaller radius.

Fig. 20 shows a roller with three rubber sleeves. This roller has an outer rim portion 220 and three rubber sleeves 222, 223, 224 that are separated by rigid sleeves 225 and 226. This roller can carry more radial load than a similar roller with only two rubber sleeves which are sufficiently thicker than sleeves 222, 223 and 224 so that the same amount of rubber is used. This roller is also harder and should be used with smaller shaft angularity on joints having more than one pair of rollers. The rim has a cylindrical outside surface 221; and it has a spherical end cap 155 bonded to it. Its inner end is sealed with a seal 227 of neoprene bonded to the rim 220 and to the spider or body 196 from which the pivot pin 195 projects.

Fig. 21 shows a roller whose rim 230 has a concave inside surface to facilitate angular adjustment of the roller. Its outside surface 231 is cylindrical. The pivot pin 235 has a convex profile 236. The rubber sleeves 232 and 233 are separated by a rigid sleeve 234. All of these sleeves are curved generally to follow the outside surface 236 of the pin 235. In an axial section the holder sleeve 234 has the shape of a crescent with somewhat blunted ends 238.

The roller of Fig. 22 has a rim portion 240 whose outside surface 241 is cylindrical, but whose inside surface 245 is conical. Here rubber sleeves 242 and 243 are provided that are separated by a rigid sleeve 244 that is generally crescent-shaped in axial section being thickest in its axially middle portion. Sleeve 242 is shaped to fit the inside and outside surfaces of rim 240 and sleeve 244. Sleeve 243 is tapered and is of greatest thickness adjacent its outer end. The sleeves 242 and 243 are bonded to the adjacent surfaces of the rim 240, pivot 195 and sleeve 244. They have convex end surfaces and are somewhat shorter in length than the rigid parts between to which they are bonded.

The cross-section of Fig. 23 shows a roller which has an outer rim portion 250 and in which the rubber is not directly bonded to its outer rim portion. It is bonded to a generally circular portion 252 of relatively rigid material that is split and has its ends separated. If desired this part may be connected or bonded to the rim 250. The rubber is separated into generally circular portions 253, 253′, by a generally circular part 254 of relatively rigid and strong material which is also split and which does not close a complete circle but is open at its ends. The rubber is bonded to it on both sides and also to the pivot 195. Like the other rollers this roller is also shown at zero load, at zero deformation. Preferably the open portions of the rigid members 252 and 254 are disposed at right angles to the direction 256 of the load. In making this roller, the outer rim 250 is applied after completion of the rubber portion. The open parts 252, 254 permit squeezing the rubber, that is, a reduction of its natural diameter. The rubber assembly, with part 252 and pivot 195, is squeezed into the outer rim 250 so that compressive pre-load is effected. This is helpful to reduce tension stresses at the bond. Here, the rubber portions need not have convex axial profiles in the unstressed state before assembly. They may be made of straight profile, if desired, or the convex profiles may also be used.

Fig. 24 shows a roller with a thin flexible outside rim 260 and with three rubber layers 262, 263, 264 separated by thin strong laminations 265 and 266. The rubber is bonded to all adjacent surfaces.

Fig. 25 shows a tapered roller whose outer rim 270 has a conical outside surface 271. It is bonded to a tapered pivot 275. The rubber sleeves 272 and 273 are separated by a rigid sleeve 274. They are also bonded thereto and to the other adjacent surfaces. The rubber sleeves are slightly tapered and have convex ends 276 in an axial section. The ends of the two rubber sleeves are displaced relative to one another in a direction generally parallel to the element of the outside surface 271, the inner sleeve 273 being the longer. Here the pivot portion 275 is secured to a holder by an integral threaded stud portion 277. Pivot 275 is slightly curved toward its large end and the sleeves 272, 273, 274 are shaped correspondingly.

It should be noted that the holding layers preferably extend somewhat beyond the rubber layers in all the embodiments illustrated. This is to avoid weakness at the corners. The shape of the end profiles of the rubber layers in each case may be controlled by the shape of the mold.

By using circular rubber laminations in accordance with my invention the capacity of a roller for radial load is multiplied while it remains soft for turning motion of the outer rim on the pivot. Also maximum performance is attained in a given limited space by using rigid holding sleeves or holding layers which are thickest at their middle portions and by making the inner rubber sleeve longer axially than the next outer one. Rollers of this kind can be used in all the universal joints described.

It should be understood that the term "rubber" is used in this specification and in the claims in its broadest sense, and that it is meant to include natural and synthetic rubbers of all kinds and broadly substances which are flexible and resilient to a degree required to carry out the described function.

While the invention has been described in connection with several different embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A universal joint for connecting two end members that have angularly disposed axes, comprising a pair of rollers mounted on one of said end members on a common axis radial to the axis of said one end member, the other end member being provided with internal ways that extend parallel to the axis of said other end member and that engage said rollers, said rollers having spherical working surfaces, and each of said ways having a cross-sectional profile that contains two opposite arcs of the same circle and a connecting portion of less curvature which intersects said circle and which is longer than one of said arcs, said connecting portion being arcuate and having its center on the axis of said other end member, opposite tangents drawn to said circle from said center including an angle larger than sixty degrees with one another.

2. A universal joint for connecting two end members that have angularly disposed axes, a plurality of yielding rollers rotatably mounted on one of said end members on intersecting axes disposed radial of the axis of said one member, said intersecting axes lying in the same plane perpendicular to the axis of said one end member, each of said rollers having an outer rim of relatively rigid material supported by a plurality of ring-shaped portions of yielding rubber-like material, adjacent ring-shaped portions being separated by and bonded to a sleeve of relatively rigid material, and the other member having ways which are engaged by said rollers.

3. A universal joint for connecting two end members that have angularly disposed axes, a plurality of yielding rollers rotatably mounted on one of said end members, each of said rollers having an axis intersecting the axis of said one end member at right angles and having an outer rim of relatively rigid material supported by a plurality of ring-shaped portions of yielding rubber-like material, adjacent ring-shaped portions being separated by and bonded to a sleeve of relatively rigid material, and the other end member having straight ways which are engaged by said rollers and which extend parallel to the axis of said other end member.

References Cited in the file of this patent

UNITED STATES PATENTS

| | | |
|---|---|---|
| 1,085,855 | Emerson | Feb. 3, 1914 |
| 1,346,253 | Rayfield | July 13, 1920 |
| 1,921,274 | Warner | Aug. 8, 1933 |
| 1,966,486 | Cutting | July 17, 1934 |
| 2,187,706 | Julien | Jan. 16, 1940 |
| 2,230,744 | Disbro | Feb. 4, 1941 |
| 2,235,002 | Anderson | Mar. 18, 1941 |
| 2,309,939 | Dodge | Feb. 2, 1943 |